United States Patent
Ekberg et al.

(10) Patent No.: US 10,242,177 B2
(45) Date of Patent: Mar. 26, 2019

(54) WIRELESS MEMORY DEVICE AUTHENTICATION

(71) Applicant: NOKIA TECHNOLOGIES OY, Espoo (FI)

(72) Inventors: Jan-Erik Ekberg, Vantaa (FI); Harald Kaaja, Järvenpää (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 15/707,008

(22) Filed: Sep. 18, 2017

(65) Prior Publication Data

US 2018/0025151 A1    Jan. 25, 2018

Related U.S. Application Data

(62) Division of application No. 14/388,673, filed as application No. PCT/FI2012/050310 on Mar. 29, 2012, now abandoned.

(51) Int. Cl.
*H04L 9/32*    (2006.01)
*G06F 21/44*    (2013.01)
*H04W 12/06*    (2009.01)
*H04L 29/06*    (2006.01)

(52) U.S. Cl.
CPC ............ *G06F 21/44* (2013.01); *H04L 9/3247* (2013.01); *H04L 9/3271* (2013.01); *H04W 12/06* (2013.01); *G06F 2221/2103* (2013.01); *H04L 63/0492* (2013.01); *H04L 63/0823* (2013.01)

(58) Field of Classification Search
CPC .......... G06F 21/00; G06F 21/30; G06F 21/44; G06F 21/60; G06F 21/78; G06F 2221/2103; H04L 9/006; H04L 9/30; H04L 9/32; H04L 9/3247; H04L 9/3263; H04L 9/3271;
(Continued)

(56) References Cited

U.S. PATENT DOCUMENTS

| 4,590,470 A | | 5/1986 | Koenig | |
|---|---|---|---|---|
| 5,467,398 A | * | 11/1995 | Pierce | ........... H04L 9/083 380/284 |
| 5,666,415 A | | 9/1997 | Kaufman | |

(Continued)

FOREIGN PATENT DOCUMENTS

| CN | 101529791 | 9/2009 |
|---|---|---|
| KR | 2009-0071874 A | 7/2009 |

(Continued)

OTHER PUBLICATIONS

"Lamport Signature", Wikipedia, Retrieved on Dec. 2, 2014, Webpage available at: http://en.wikipedia.org/wiki/Lamport_signature.

(Continued)

*Primary Examiner* — Eric W Shepperd
(74) *Attorney, Agent, or Firm* — Alston & Bird LLP

(57) ABSTRACT

A system for wireless memory device authentication is provided, wherein a communications device receives a certified public key from a wireless memory device. The communications device validates the public key and send a challenge to the wireless memory device. The wireless memory device sends a signature to the communications device and the communications device validates the signature in order to authenticate the wireless memory device.

17 Claims, 2 Drawing Sheets

(58) Field of Classification Search
CPC . H04L 2209/80; H04L 63/08; H04L 63/0823; H04L 63/12
See application file for complete search history.

(56) References Cited

U.S. PATENT DOCUMENTS

| | | | |
|---|---|---|---|
| 6,701,434 | B1 | 3/2004 | Rohatgi |
| 8,112,626 | B1 | 2/2012 | Adler et al. |
| 8,230,231 | B2* | 7/2012 | Freeman .................. G06F 21/31 380/44 |
| 9,111,283 | B1 | 8/2015 | Diorio et al. |
| 2003/0149869 | A1* | 8/2003 | Gleichauf ............... H04L 45/50 713/153 |
| 2004/0066278 | A1 | 4/2004 | Hughes et al. |
| 2005/0071631 | A1 | 3/2005 | Langer |
| 2006/0236098 | A1 | 10/2006 | Gantman et al. |
| 2007/0009102 | A1 | 1/2007 | Gong et al. |
| 2007/0058815 | A1 | 3/2007 | Kwak et al. |
| 2007/0106897 | A1 | 5/2007 | Kulakowski |
| 2007/0187505 | A1 | 8/2007 | Rhoads et al. |
| 2007/0237144 | A1* | 10/2007 | Adhikari .................. H04L 9/12 370/392 |
| 2008/0095360 | A1 | 4/2008 | Vuillaume et al. |
| 2008/0112596 | A1 | 5/2008 | Rhoads et al. |
| 2008/0170695 | A1 | 7/2008 | Adler et al. |
| 2008/0212771 | A1* | 9/2008 | Hauser .................. G06F 21/305 380/44 |
| 2009/0265544 | A1 | 10/2009 | Moona et al. |
| 2012/0128157 | A1 | 5/2012 | Braun |
| 2012/0154411 | A1 | 6/2012 | Schattleitner et al. |
| 2013/0148805 | A1 | 6/2013 | Ekberg et al. |
| 2013/0191899 | A1* | 7/2013 | Eldefrawy ............ H04L 9/3228 726/6 |

FOREIGN PATENT DOCUMENTS

| | | |
|---|---|---|
| WO | WO 2008/033590 A1 | 3/2008 |
| WO | WO 2012/172391 A1 | 12/2012 |

OTHER PUBLICATIONS

Advisory Action for U.S. Appl. No. 14/388,673 dated Jun. 8, 2017.
Bolotnyy et al., "Generalized "Yoking-Proofs" and Inter-Tag Communication", Development and Implementation of RFID Technology, Chapter 24, 2009, pp. 447-462.
Catalano et al., "Off-Line/On-Line Signatures: Theoretical Aspects and Experimental Results*", Proceedings of the Practice and theory in public key cryptography, 11th international conference on Public key cryptography, 2008, 20 pages.
Extended European Search Report for corresponding European Application No. 12873182.5 dated Oct. 28, 2015, 6 pages.
International Search Report received for corresponding Patent Cooperation Treaty Application No. PCT/FI2012/050310, dated Dec. 20, 2012, 11 pages.
International Written Opinion for corresponding International Application No. PCT/FI2012/050310, dated Dec. 20, 2012.
Lamport, "Password Authentication With Insecure Communication", Comunications of the ACM, vol. 24, Issue 11, Nov. 1981, pp. 770-772.
Office Action for corresponding Chinese Application No. 201280072080.0 dated May 22, 2017, 18 pages.
Office Action for U.S. Appl. No. 14/388,673 dated Dec. 15, 2015.
Office Action for U.S. Appl. No. 14/388,673 dated Jun. 23, 2016.
Office Action for U.S. Appl. No. 14/388,673 dated Mar. 16, 2017.
Office Action for U.S. Appl. No. 14/388,673 dated Sep. 22, 2016.
Vuillaume et al., "Public Key Authentication with Memory Tokens", In: Information Security Applications, 9th International Workshop, WISA 2008, Jeju Island, Korea, Sep. 23-25, 200, retrieved from the Internet: <URL: http://dx.doi.org/10.1007/978-3-642-00306-6_7>.
Vuillaume et al., "Public Key Authentication With Memory Tokens", Information Security Applications, Lecture Notes in Computer Science, vol. 5379, 2009, 15 pages.
Wikipedia "Lamport signature" [Online], Oct. 19, 2011 [Retrieved Jun. 16, 2016], Internet Archive Wayback Machine, web.archive.org, [Retrieved from: <https://web.archive.org/web/20111019140512/http://en.wikipedia.org/wiki/Lamport_signature>].
Office Action for Chinese Application No. 201280072080.0 dated May 9, 2018, 5 pages.
Office Action for Chinese Patent Application No. 201280072080.0 dated Dec. 13, 2017, with English Translation, 15 pages.
Office Action for corresponding European Application No. 12873182.5 dated Oct. 9, 2018, 5 pages.
Office Action for corresponding Chinese Application No. 201280072080.0 dated Oct. 24, 2018, with English Translation, 10 pages.

* cited by examiner

WIRELESS MEMORY DEVICE AUTHENTICATION

CROSS REFERENCE TO RELATED APPLICATIONS

This application is a divisional of U.S. application Ser. No. 14/388,673, filed Sep. 26, 2014, which is a U. S. National Phase application of PCT/FI2012/050310, filed Mar. 29, 2012, the entire contents of which are incorporated herein by reference.

TECHNICAL FIELD

The present application generally relates to wireless memory device authentication.

BACKGROUND

Mobile communication devices and their environments are becoming increasingly complicated and the security demands of communication are increasing respectively. The increase of the number of devices and services providing information or distributed content through wireless communications has created new demands for security of communications.

Moreover, as secure communications solutions are becoming more and more common, the number of manufacturers of devices, such as radio frequency memory tags and wireless memories capable of secure communication is increasing, and accordingly the number, quality and type of devices on the market increases.

The user of a mobile communication device is also faced with threats such as malicious communication, phishing and identity theft, which increases the need for secure communications infrastructure. It is in the interest of both the user of a mobile communications device and the owner of the device being communicated with to ascertain that a secure communication is feasible.

SUMMARY

Various aspects of examples of the invention are set out in the claims.

According to a first example aspect of the invention, there is provided a communications device comprising:
a first memory unit;
a first input/output interface; and
at least one first processor configured to:
receive a certified public key from a wireless memory device;
validate the public key;
send a challenge to the wireless memory device;
receive a signature from the wireless memory device; and to
validate the signature in order to authenticate the wireless memory device.

The at least one first processor may be further configured to form a key stream; and to send the key stream to the wireless memory device.

The at least one first processor may be further configured to validate the signature using a Lamport signature scheme.

According to a second example aspect of the invention there is provided a wireless memory device comprising:
a second memory unit;
a second input/output interface; and
at least one second processor configured to:
receive a challenge from a communications device;
form a signature from a private key based on the challenge;
send the signature to a communications device; and to
destroy the private key.

The at least one second processor may be further configured to receive a key stream from the communications device.

The at least one second processor may be further configured to form the signature using a Lamport signature scheme.

The second memory unit may comprise at least one pre-stored certified public key and at least one pre-stored private key.

The wireless memory device may be a radio frequency memory tag.

According to a third example aspect of the invention, there is provided a system comprising a communications device according to the first example aspect of the invention; and a wireless memory device according to a second example aspect of the invention.

According to a fourth example aspect of the invention, there is provided a method comprising:
receiving a certified public key from a wireless memory device;
validating the public key;
sending a challenge to the wireless memory device;
receiving a signature from the wireless memory device; and
validating the signature in order to authenticate the wireless memory device. The method may further comprise forming a key stream; and sending the key stream to the wireless memory device.

The method may further comprise validating the signature using a Lamport signature scheme.

According to a fifth example embodiment, there is provided a method comprising:
receiving a challenge from a communications device;
forming a signature from a private key based on the challenge;
sending the signature to a communications device; and
destroying the private key.

The method may further comprise receiving a key stream from the communications device.

The method may further comprise forming the signature using a Lamport signature scheme.

According to a sixth example aspect of the invention, there is provided a computer program, comprising:
code for performing a method of any example aspect of the invention, when the computer program is run on a processor.

According to a seventh example aspect of the invention, there is provided a memory medium comprising the computer program of the seventh example aspect.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and example embodiments of the present invention have been illustrated in the foregoing. The foregoing example embodiments are used merely to explain selected aspects or steps that may be utilized in implementations of the present invention. Some example embodiments may be presented only with reference to certain example aspects of the invention. It should be appreciated that corresponding example embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 4 of the drawings.

Figure 1:
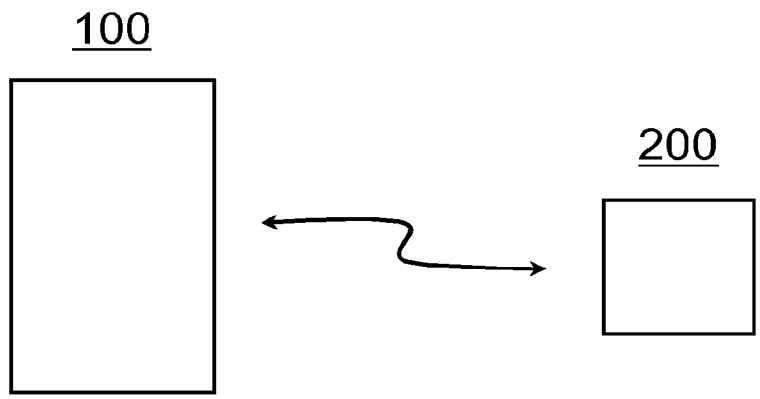
FIG. 1 shows a block diagram of the environment of the wireless memory device authentication according to an example embodiment.

FIG. 1 illustrates a block diagram of an environment of the wireless memory device authentication according to an example embodiment. As shown in FIG. 1, a communications device 100 and a wireless memory device 200 form the environment. The communications device 100 is configured to communicate with the wireless memory device 200. The communications device 100 is further configured to authenticate the wireless memory device in accordance with an example embodiment of the wireless memory device authentication method described hereinafter. The communications device 100 is further configured to form and/or to compute and/or to encrypt and to store a key stream into a memory unit 210 of the wireless memory device 200 in order to configure the wireless memory device 200 for further communication based on a prior successful authentication during a first communication with the wireless memory device 200.

In an example embodiment, the communications device 100 is at least one of: a personal computer; a server computer; a mobile phone; a tablet computer; a handheld device; and a portable electronic device.

In an example embodiment, the wireless memory device 200 is a radio frequency (RF) memory tag. In a further example embodiment, the RF memory tag is a standalone RF memory tag, such as an RFID tag, which is either integrated or embedded into a communications device or not integrated or embedded. In an example embodiment the wireless memory device 200 is configured for near field communication (NFC) or otherwise configured for wireless communication with high capacity and high data rates. The wireless memory device 200 is, in one example embodiment, an active device that comprises an internal power source. In another example embodiment, the wireless memory device 200 is a passive device that relies on receiving a powering signal. Moreover, in one example embodiment, the wireless memory device 200 is able to operate either as a passive or an active device.

In an example embodiment, the communications device 100 and the wireless memory device 200 are configured to support wireless communications, wherein one radio frequency, e.g. ultra-high frequency (UHF), is provided for power transfer and other radio frequency signals, e.g. Impulse ultra-wideband (UWB) signals, are provided for wireless data transfer. Moreover, in one example embodiment, the communications device 100 and the wireless memory device 200 are configured to support wireless communications using near field communication (NFC) for power transfer and for finding and selecting other devices in the proximity. The wireless memory device 200 is further configured to support near field communication (NFC) for initial data transfer and further configured to support wideband wireless communications, e.g. impulse ultra-wideband (UWB), for any further data transfer requiring high capacity. In FIG. 1, the communications device 100 and the wireless memory device 200 are configured to support secure communications, and the communications device 100 is further configured to verify that the wireless memory device 200 is configured to support secure communications in a compatible manner using wireless memory device authentication according to an example embodiment.

Figure 2:
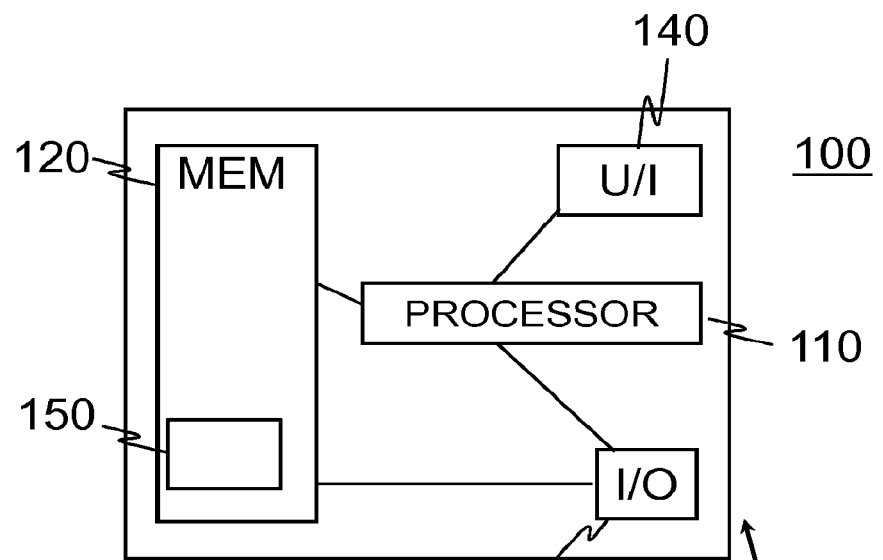
FIG. 2 shows a block diagram of a system suited for wireless memory device authentication according to an example embodiment.
Figure 2:
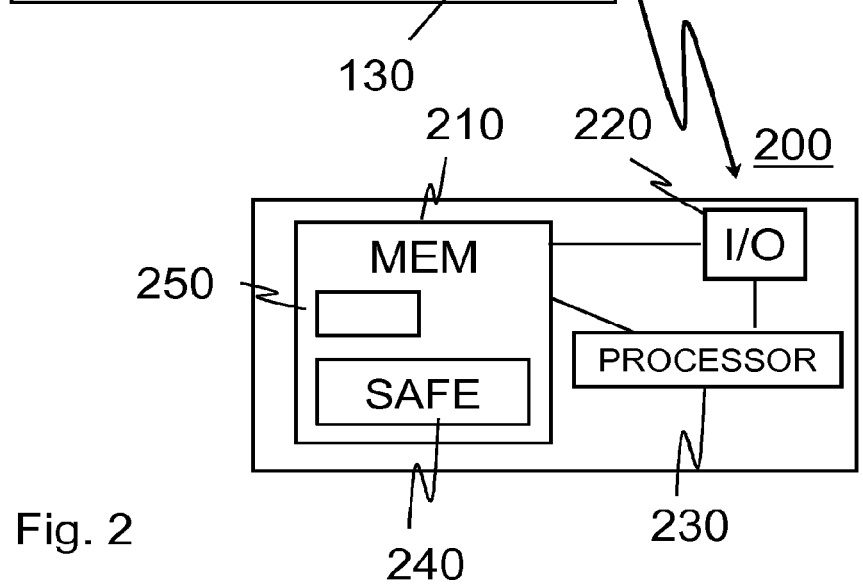

FIG. 2 illustrates a block diagram of a system suited for wireless memory device authentication according to an example embodiment. FIG. 2 shows some basic blocks of the communications device 100 and a wireless memory device 200. The communications device 100 comprises a processor 110, a first memory unit 120, an input/output (I/O) interface 130, and a user interface (UI) 140. The communications device 100 further comprises software 150 stored in the first memory unit 120 and operable to be loaded into and executed in the processor 110. According to an example embodiment the processor 110 is a central processing unit (CPU), a microprocessor, a digital signal processor (DSP) or the like. FIG. 2 shows one processor in the communications device 100 as well as in the wireless memory device 200, but in some embodiments the communications device 100 and/or the wireless memory device 200 can be provided with a plurality of processors.

The wireless memory device 200 comprises a processor 230, an input/output (I/O) interface 220, a second memory unit 210, and a protected section 240. The wireless memory device 200 further comprises software 250 stored in the second memory unit 210 and operable to be loaded into and executed in the processor 230. According to an example embodiment the processor 210 is a central processing unit (CPU), a microprocessor, a digital signal processor (DSP) or the like. In an example embodiment, the computing power of the wireless memory device is low. In an example embodiment the memory unit 210 of the wireless memory device 200 comprises dedicated memory areas for storing the public and private keys and the data provided by the communications device 100 based on a successful authentication.

The wireless memory device 200 should be configured for secure communications, i.e. to implement a specific set of functions to serve as building blocks when secure communications are set up. The communications device 100 is configured to communicate with the wireless memory device 200 and to authenticate the wireless memory device 200 according to example embodiments. The authentication ascertains that the wireless memory device 200 is configured for secure communications in a compatible manner.

The input/output interface 130 of the communications device 100 is configured to send and receive signals to and from the wireless memory device 200 using wireless communications. Respectively, the input/output interface 220 of the wireless memory device 200 is configured to send and receive messages to and from the communications device 100. The input/output interfaces 130, 220 are configured to be in connection with and are configured to be controlled by the corresponding processors 110, 230 and/or any software executed by the processors 110, 230.

In an example embodiment, the wireless memory device 200 or the input/output interface 220 thereof comprises an interface configured to derive power from the activation and/or powering signals received by the input/output interface 220 of the wireless memory device 200.

In an example embodiment, the first memory unit 120 and second memory unit 210 are configured to store information, or data, and further configured to receive information from other parts of the devices and to send information to the other parts of the device, i.e. to read and write information. The first and second memory units 120, 210 are configured to be in connection with and controlled by the processor 110, 230. In a further example embodiment, either the communications device 100 or the wireless memory device 200 is configured to function in a passive mode. In a passive mode, the processor 110, 230 of either the communications device 100 or the wireless memory device 200 is not active and the first or second memory unit 120, 210 is configured to be controlled by the processor 110, 230 of the active device. In an example embodiment, the second memory unit 210 comprises a protected section 240. The first and second memory units 120, 210 comprise any memory compatible with secure communications and selected from a non-volatile and/or a volatile memory unit, such as a read-only memory unit (ROM), a programmable read-only memory unit (PROM), erasable programmable read-only memory unit (EPROM), a random-access memory unit (RAM), a flash memory unit, a data disk, an optical storage, a magnetic storage and/or a smart card.

In an example embodiment, the communications device 100 and the wireless memory device 200 comprise a plurality of memory units. Each memory unit is either configured solely to store information or configured to serve other purposes in communication with further parts, such as to process information. Each memory unit is further configured to support secure communications. In an example embodiment the second memory unit 210 of the wireless memory device 200 is configured to store at least one digital signature. Furthermore, the processor 230 of the wireless memory device 200 is configured to choose or look up elements of a digital signature based on data received from a communications device 100.

In addition to the elements shown in FIG. 2, in some example embodiments the communications device 100 and/or the wireless memory device 200 comprise other elements, such as microphones or displays, as well as additional circuitry, memory chips, application-specific integrated circuits (ASIC), processing circuitry for specific purposes such as source coding and decoding circuitry, channel coding and decoding circuitry, ciphering and deciphering circuitry, and the like.

Figure 3:
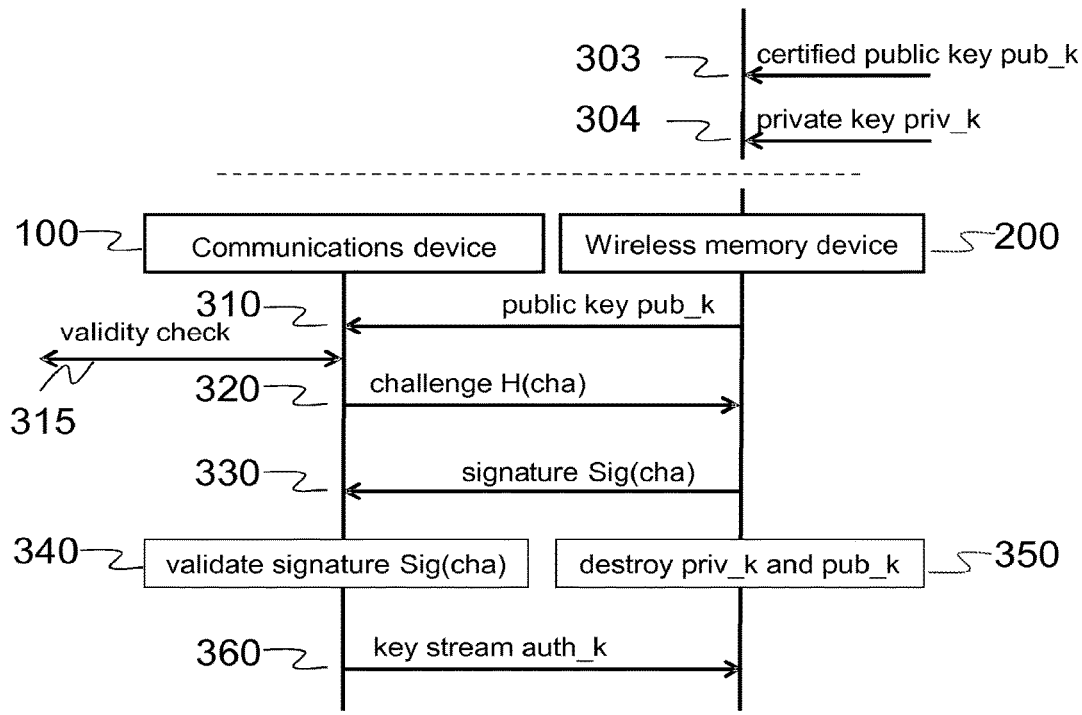
FIG. 3 shows a messaging sequence chart according to an example embodiment.
Figure 4:
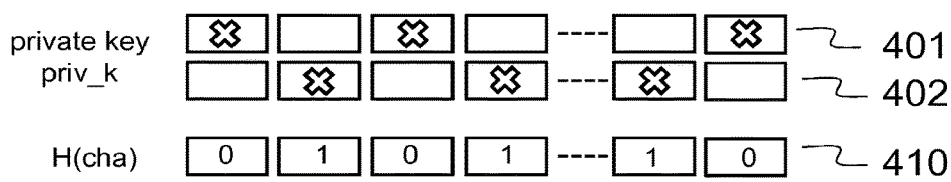
FIG. 4 shows the forming of the signature based on the challenge according to an example embodiment.

FIG. 3 illustrates a messaging sequence chart according to an example embodiment. A certified public key pub_k and a private key priv_k are stored in the memory unit 210 of the wireless memory device 200 prior to the wireless memory device being taken into use 303, 304. In an example embodiment, the manufacturer of the wireless memory device generates the public key pub_k and the private key priv_k and stores them in the memory unit 210 of the wireless memory device 200. In order to certify the pair of keys pub_k, priv_k on the wireless memory device 200, the generator of the keys signs them with her own trust root, e.g. a RSA signature. The public key pub_k stored in the memory unit 210 of the wireless memory device 200 is in a format that is universally readable. In an example embodiment, the public key pub_k and the private key priv_k are formed in accordance with the Lamport signature scheme.

The example wireless memory device authentication method is carried out as illustrated in the message sequence chart only the first time a communications device 100 communicates with the wireless memory device 200. First, the communications device 100 reads or receives 310 the public key pub_k from the wireless memory device 200 and checks 315 the validity of the public key pub_k based on the certificate, or trust root, of the generator of the keys on the wireless memory device 200. The validity of the certificate is checked from a local list or through communications services.

The communications device 100 sends 320 a challenge H(cha) to the wireless memory device 200. In an example embodiment, the challenge H(cha) comprises a predetermined number of bits. The wireless memory device 200 forms a signature Sig(cha) 330 based on the challenge H(cha) received from the communications device 100 and sends signature Sig(cha) 330 it to the communications device 100. According to an embodiment, the public key pub_k and the private key priv_k stored in the memory unit 210 of the wireless memory device 200 are formed in accordance with the Lamport signature scheme, wherein the private key consists of a predetermined number, e.g. 256 of pairs of random numbers 401, 402 and the public key is formed by hashing these random numbers. In an example embodiment, the signature Sig(cha) 330 is formed by choosing, or looking up in a table, from the private key priv_k for each bit 410 of the challenge H(cha) either the first or second number of a pair of numbers in accordance with the value of the respective bit of the challenge H(cha).

The communications device 100 checks 340 the validity of the signature Sig(cha) 330 received as a response to the challenge H(cha). In an example embodiment the signature Sig(cha) 330 is validated by first choosing, or looking up in a table, from the public key pub_k for each bit of the challenge either the first or second number of a pair of numbers in accordance with the value of the respective bit of the challenge H(cha), hashing the numbers of the signature Sig(cha) 330 and comparing the hashed numbers of the signature with the numbers chosen from the public key pub_k. Should the numbers match, the signature is valid.

The private key priv_k and the public key pub_k are destroyed 350, i.e. deleted from the wireless memory device 200 substantially immediately after they have been used to form the signature Sig(cha) 330. Accordingly, the private key priv_k and the public key pub_k are used only once and the private key priv_k is never sent out or copied from the memory unit 210 of the wireless memory device 200, but only used to form the signature Sig(cha) 330. In an example embodiment, the memory unit 210 of wireless memory device 200 contains several pairs of public and private keys in order for several communications devices to authenticate the wireless memory device 200.

As hereinbefore described, the example wireless memory device authentication is only carried out once for each wireless memory device during the first communication with the wireless memory device in question. For purposes of further communication, the communication device sends 360 a key stream auth_k to the wireless memory device 200. The key stream auth_k is stored in the memory unit 210 of the wireless memory device 200 and is used to authenticate and/or secure any further communication between the communication device 100 and the wireless memory device 200 in a conventional manner. In an example embodiment, the communications device 100 would before further communication make certain that the wireless memory device 200 is authenticated for example by requiring the wireless memory device 200 to return a certain part of the key stream auth_k.

In an example embodiment, as hereinbefore described, the wireless memory device 200 contains several pairs of public and private keys in order for several communications devices to authenticate the wireless memory device 200. The wireless memory device 200 accordingly receives several key streams auth_k from the several communications devices. In a further example embodiment, the wireless memory device needs to be partially authenticated by several communications devices to enable a valid authentication. The RF memory device 200 receives a key stream auth_k or a part of a key stream auth_k from each participating communications device 100. These key streams auth_k or a key stream auth_k assembled from the parts of the key stream received are/is stored in the memory unit 210 of the wireless memory device 200. The key streams or key stream are/is used for further communication as described hereinbefore with reference to one communications device 100.

In an example embodiment the authentication of the wireless memory device 200 is time dependent. To enable the time dependency, the key stream auth_k sent to the wireless memory device contains a time stamp in order to limit the validity of authentication to a certain period of time, e.g. valid for five days. In a further example embodiment the validity is limited to a certain time of the day, week or month, e.g. valid Thursdays 9 am to 5 pm.

Some use cases relating to given example embodiments of the wireless memory device authentication are presented in the following. In a first use case, the wireless memory device authentication is generally used in connection with wireless memory devices in situations or transactions which benefit from cryptographically authenticated communication. For example situations in which a user of a communications device encounters a new wireless memory device, for example a newly-purchased radio frequency memory tag or otherwise a previously unknown wireless memory device. In this kind of situation, the user of the communications device wishes to make certain that the wireless memory device can be used in secure communications. For this purpose the manufacturer of the device and its compliance with security standards is found out and the wireless memory device is authenticated for further communication.

In a second use case, the wireless memory device authentication is applied by a user of a communications device in order to keep track of her communications history. The communications device of the user stores a history of all communications with various wireless memory devices by saving the authentication key streams sent to the wireless memory devices together with identifying information on the communications, such as manufacturer of the wireless memory device as well as time and place of the communication. Should the user of a communications device later receive a communication or a message or the like from an owner of a wireless memory device with which a communication had previously occurred, the user of the communications device would be immediately aware which previous communication had caused the new contact, since the new communication would contain the authentication key stream. Furthermore, in an example use case of the wireless memory device authentication, the communications device is provided with a user interface for controlling the communications history, setting or enforcing privacy rules and for accepting or declining any further communications occurring due to previous communications Without in any way limiting the scope, interpretation, or application of the appended claims, a technical effect of one or more of the example embodiments disclosed herein is to provide a way of ascertaining that wireless memory devices with which a communications device communicates are truly capable of secure communication and have no malicious intent. Another technical effect of one or more of the example embodiments disclosed herein is to make it possible to use passive wireless memory devices, e.g. passive RF memory tags in secure communications since little computational power is required on the wireless memory device. Another technical effect of one or more of the example embodiments disclosed herein is to provide a secure authentication method.

It will be understood that each operation of the flowchart, and/or combinations of operations in the flowchart can be implemented by various means. Means for implementing the operations of the flowchart, combinations of the operations in the flowchart, or other functionality of the example embodiments described herein may comprise software, hardware, application logic or a combination of software, hardware and application logic. The application logic, software or an instruction set is maintained on any one of various conventional computer-readable media. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the afore-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

What is claimed is:

1. A wireless memory device comprising:
   a memory unit; and
   at least one processor configured to:
   receive a challenge comprising a plurality of bits from a communications device; and
   in an instance where the challenge is a first challenge from the communications device:
   form a signature comprising a plurality of numbers from a public key and a private key based on the challenge by looking up the challenge in a table and, for each bit of the plurality of bits of the challenge, forming the signature from either a first or second number of a pair of numbers in accordance with a value of the respective bit of the challenge, wherein a plurality of pairs of public and private keys are stored by the memory unit and each pair of the plurality of pairs of the public key and the private key are used only once to form the signature and never sent out or copied from the memory unit;

cause the signature to be sent to the communications device;

receive a key stream from the communications device; and destroy the private key, wherein the signature was formed with a private key associated with each bit of the plurality of bits of the challenge; and the private key further comprises a pair of random numbers in accordance with a value of a respective bit of the plurality of bits of the challenge; and in an instance where the challenge is not the first challenge from the communications device:

cause at least a portion of the key stream to be sent to the communications device to make certain that the wireless memory device is authenticated.

2. The wireless memory device of claim 1, wherein the at least one processor is further configured to form the signature using a Lamport signature scheme.

3. The wireless memory device of claim 1, wherein the memory unit comprises at least one pre-stored certified public key and at least one pre-stored private key.

4. The device of claim 1, wherein the wireless memory device comprises a radio frequency memory tag.

5. A method comprising:

receiving a challenge comprising a plurality of bits from a communications device; and in an instance where the challenge is a first challenge from the communications device:

forming a signature comprising a plurality of numbers from a public key and a private key based on the challenge by looking up the challenge in a table and, for each bit of the plurality of bits of the challenge, forming the signature from either a first or second number of a pair of numbers in accordance with a value of the respective bit of the challenge, wherein a plurality of pairs of public and private keys are stored by a memory unit and each pair of the plurality of pairs of the public key and the private key are used only once to form the signature and never sent out or copied from the memory unit;

causing the signature to be sent to the communications device;

receive a key stream from the communications device; and destroying the private key, wherein the signature was formed with a private key associated with each bit of the plurality of bits of the challenge; and the private key further comprises a pair of random numbers in accordance with a value of a respective bit of the plurality of bits of the challenge; and in an instance where the challenge is not the first challenge from the communications device:

causing at least a portion of the key stream to be sent to the communications device.

6. The method of claim 5 wherein receiving a challenge is carried out by a wireless memory device comprising a memory unit and at least one processor, wherein the memory unit comprises at least one pre-stored certified public key and at least one pre-stored private key.

7. The method of claim 5 further comprising forming the signature using a Lamport signature scheme.

8. An apparatus, comprising:

at least one processor and at least one memory including a computer program code, wherein the at least one memory including the computer program code is configured, with the at least one processor, at least to:

receive a challenge comprising a plurality of bits from a communications device; and in an instance where the challenge is a first challenge from the communications device:

form a signature comprising a plurality of numbers from a public key and a private key based on the challenge by looking up the challenge in a table and, for each bit of the plurality of bits of the challenge, forming the signature from either a first or second number of a pair of numbers in accordance with a value of the respective bit of the plurality of bits of the challenge, wherein a plurality of pairs of public and private keys are stored on a memory unit and each pair of the plurality of pairs of the public key and the private key are used only once to form the signature and never sent out or copied from the memory unit;

cause the signature to be sent to the communications device;

receive a key stream from the communications device; and destroy the private key, wherein the signature was formed with a private key associated with each bit of the plurality of bits of the challenge; and the private key further comprises a pair of random numbers in accordance with a value of a respective bit of the plurality of bits of the challenge; and in an instance where the challenge is not the first challenge from the communications device:

cause at least a portion of the key stream to be sent to the communications device to make certain the wireless memory device is authenticated.

9. The apparatus of claim 8, wherein the at least one memory comprises at least one pre-stored certified public key and at least one pre-stored private key.

10. The apparatus of claim 8, wherein the at least one memory including the computer program code is further configured to, with the at least one processor, cause the apparatus to form the signature using a Lamport signature scheme.

11. A computer program product comprising:

at least one non-transitory computer-readable storage medium having computer-readable program instructions stored therein with the computer-readable program instructions comprising program instructions configured to:

receive a challenge comprising a plurality of bits from a communications device; and in an instance where the challenge is a first challenge from the communications device:

form a signature comprising a plurality of numbers from a public key and a private key based on the challenge by looking up the challenge in a table and, for each bit of the plurality of bits of the challenge, forming the signature from either a first or second number of a pair of numbers in accordance with a value of the respective bit of the plurality of bits of the challenge, wherein a plurality of pairs of public and private keys are stored on a memory unit and each pair of the plurality of pairs of the public key and the private key are used only once to form the signature and never sent out or copied from the memory unit;

cause the signature to be sent to the communications device;
receive a key stream from the communications device; and
destroy the private key, wherein the signature was formed with a private key associated with each bit of the plurality of bits of the challenge; and the private key further comprises a pair of random numbers in accordance with a value of a respective bit of the plurality of bits of the challenge; and
in an instance where the challenge is not the first challenge from the communications device:
cause at least a portion of the key stream to be sent to the communications device.

12. A computer program product according to claim 11 further comprises program code which when executed by an apparatus causes the apparatus at least to receive a key stream from the communications device.

13. A computer program product according to claim 11 further comprises program code which when executed by an apparatus causes the apparatus at least to form the signature using a Lamport signature scheme.

14. A method comprising:
receiving a challenge comprising a plurality of bits from a communications device; and
in an instance where the challenge is a first challenge from the communications device:
forming a signature comprising a plurality of numbers from a public key and a private key based on the challenge by looking up the challenge in a table and, for each bit of the plurality of bits of the challenge, forming the signature from either a first or second number of a pair of numbers in accordance with a value of the respective bit of the plurality of bits of the challenge, wherein a plurality of pairs of public and private keys are stored by a memory unit and each pair of the plurality of pairs of the public key and the private key are used only once to form the signature and never sent out or copied from the memory unit;
causing the signature to be sent to the communications device; and
receiving a key stream from the communications device; and
in an instance where the challenge is not a first challenge from the communications device:
causing at least a portion of the key stream to be sent to the communications device to make certain that communications with the communications device is authenticated.

15. The method of claim 14, wherein the signature is formed using a Lamport signature scheme.

16. The method of claim 15, wherein the key stream contains a time stamp in order to limit a validity of authentication to one or more of a particular duration of time after the time stamp, a particular day, or a particular time of day.

17. The method of claim 15, further comprising:
receiving an authentication key from the communications device, the authentication key comprising a time stamp in order to limit a validity of authentication to a certain time of day; and
causing communication with the communications device.

* * * * *